R. B. ALTENBURG.
ADJUSTABLE TIRE RIM.
APPLICATION FILED DEC. 23, 1916. RENEWED SEPT. 15, 1917.
1,263,356.
Patented Apr. 23, 1918.
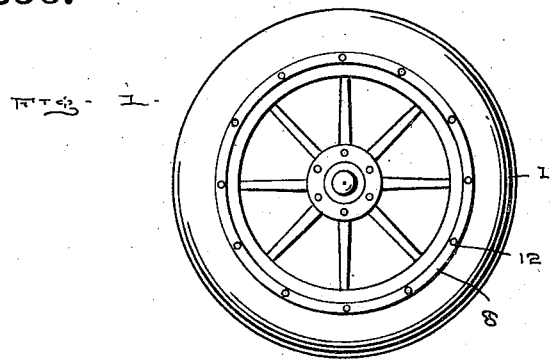
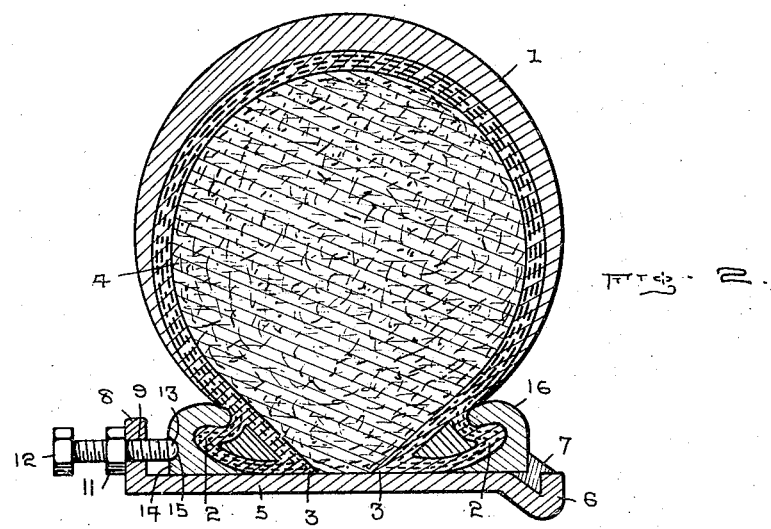
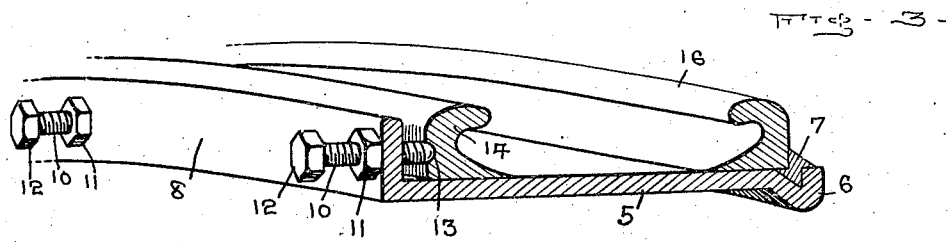
Inventor
R. B. Altenburg
By W. J. Fitz Gerald & Co.
Attorneys
Witness
Thos. W. Riey
Frank B. Hoffman

UNITED STATES PATENT OFFICE.

REINHART B. ALTENBURG, OF DAVENPORT, IOWA.

ADJUSTABLE TIRE-RIM.

1,263,356.  Specification of Letters Patent. Patented Apr. 23, 1918.

Application filed December 23, 1916, Serial No. 138,622. Renewed September 15, 1917. Serial No. 191,651.

*To all whom it may concern:*

Be it known that I, REINHART B. ALTENBURG, a citizen of the United States, residing at Davenport, in the county of Scott and State of Iowa, have invented certain new and useful Improvements in an Adjustable Tire-Rim; and I do hereby declare the following to be a full, clear, and exact description of the invention, such as will enable others skilled in the art to which it appertains to make and use the same.

This invention relates to a vehicle tire and rim construction, and more particularly to an adjustable tire rim.

The principal object of this invention is to position a rubber filler within the ordinary pneumatic tire casing and to provide an adjustable rim designed to coöperate with the inner edges of the tire casing, whereby the compression of the rubber filler may be varied at will, which compression is designed to control the standing up of the tire casing under a load.

Another object of the invention is to provide a tire rim carrying a pair of retaining rings, one of said retaining rings being adjustable laterally of the rim, and means for adjusting the ring laterally to draw the inner beaded edges of the tire casing toward each other.

A further object of the invention is to provide means whereby the compression of the rubber filler may be quickly and readily increased or decreased and locked in such adjusted position.

With these and other objects in view as will appear as the description proceeds, the invention comprises the various novel features of construction, combination and arrangement of parts as will be more fully described hereinafter and set forth with particularity in the appended claims.

Referring to the drawings,

Figure 1 is a side elevation of my improved tire rim with a tire shown in position thereon, the rim being positioned upon the wheel.

Fig. 2 is a vertical transverse sectional view through my improved rim, showing a pneumatic tire casing attached thereto and having a rubber filler positioned therein.

Fig. 3 is a sectional perspective view of my improved rim construction.

Similar characters of reference are used to denote like parts throughout the accompanying drawings and the following description.

Referring more particularly to the drawings, the reference numeral 1 indicates an ordinary pneumatic tire casing that is provided with the usual construction of beads 2 which extend inwardly of the casing and terminate at the inner opposed edges 3 of the casing. Positioned within this tire casing 1 is a rubber filler 4, which is designed to be constructed of a particular composition so as to give it a maximum amount of durability and resiliency.

The tire casing is positioned upon the tire rim 5 which is provided at the outer side with an inset flange 6 that is designed to receive and retain in position a locking ring 7. The inner circumferential edge of the rim 5 is formed with an outwardly extending circumferential flange 8 which is provided circumferentially with a series of spaced threaded apertures 9 through each of which extends an adjusting screw 10 that is designed to be locked in any desired adjusted position through the flange by a lock nut 11. Each of these adjusting screws 10 is provided at one end with a head 12 and has its opposite or inner end rounded as indicated at 13.

This inner rounded end of each of the screws 10 is designed to bear against the inner bead engaging ring 14 or in depressions or a circumferentially extending recess 15. This inner ring 14 is slidably mounted transversely of the rim 5 on the outer circumference thereof, and positioned upon the opposite side of the rim is an outer bead engaging ring 16 that is designed to bear against the locking ring 7.

In order to assemble and position a tire upon the rim, the adjusting screws 10 are moved outwardly so that the tire casing with the rubber filler therein can be easily and quickly positioned upon the rim, after which the outer ring 16 and the locking ring 7 are arranged in position to hold the tire in place. This having been done, the adjusting screws 10 are screwed inwardly so as to move the inner bead engaging ring 14 transversely of the rim, this inner movement of the ring 14 regulating the amount of compression that is placed upon the rubber filler 4, which in turn regulates the standing up of a tire under a load. When the desired compression has been placed upon the filler by drawing the inner edges of the tire casing together over the filler, the lock nuts 11 are set up against the flange 8 so as to hold and retain the adjusting screws in adjusted position.

By this arrangement and construction shown and described above, it will be manifest that any desired amount of compression may be readily placed upon the rubber filler, this compression tending to stiffen or harden the rubber filler sufficiently to hold and retain the tire casing in its normal position, so that it will effectively stand up under a load when in use.

What I claim is:—

1. The combination with a tire casing, and a rubber filler adapted to be positioned within said casing, of a rim for said casing, tire casing engaging rings carried by the opposite sides of said rim, one of said rings being slidably mounted upon said rim, and an outwardly and circumferentially extending flange carried by one side edge of said rim, and adjustable means carried by said circumferentially extending flange, whereby said slidably mounted ring may be adjusted transversely of the rim to compress the rubber filler within the tire casing.

2. The combination with a tire casing, and a resilient filler designed to be positioned therein, of a rim for said casing, tire engaging rings mounted upon said rim, one of said rings being slidably mounted upon the rim, an outwardly and circumferentially extending flange formed on one side edge of the rim, a plurality of adjusting screws disposed through said circumferentially extending flange at spaced intervals and adapted to engage said slidably mounted ring whereby the inner edges of the tire casing may be drawn toward each other, and means for locking said adjusting screws in adjusted position.

3. The combination with a tire casing, and a resilient filler adapted to be positioned within said casing, of a rim for said casing, demountable tire casing engaging rings carried by the opposite sides of said rim, means for locking one of said rings to one side of the rim, the other of said rings being slidably mounted upon the rim, an outwardly and circumferentially extending flange carried by one side edge of said rim, a plurality of adjusting screws disposed through said circumferentially extending flange, whereby said slidably mounted ring may be adjusted transversely of the rim to compress the filler within the tire casing, and a lock nut mounted on each screw and adapted to be turned up against said circumferential flange to maintain the adjustment of said screw.

In testimony whereof I have signed my name to this specification in the presence of two subscribing witnesses.

REINHART B. ALTENBURG.

Witnesses:
PHIL DAUM,
R. W. RICK.

Copies of this patent may be obtained for five cents each, by addressing the "Commissioner of Patents, Washington, D. C."